United States Patent
Duval et al.

Patent Number: 6,144,290
Date of Patent: Nov. 7, 2000

[54] CONTROL DEVICE FOR THE EMISSION OF CARRIER CURRENTS ON A LOW VOLTAGE NETWORK

[75] Inventors: Guillaume Duval, Chatenay Malabry; Daniel Chaffanjon, Montgeron, both of France

[73] Assignee: Electricite de France, Service National, Paris, France

[21] Appl. No.: 09/341,852

[22] PCT Filed: Mar. 9, 1998

[86] PCT No.: PCT/FR98/00464

§ 371 Date: Jul. 20, 1999

§ 102(e) Date: Jul. 20, 1999

[87] PCT Pub. No.: WO98/40975

PCT Pub. Date: Sep. 17, 1998

[30] Foreign Application Priority Data

Nov. 3, 1997 [FR] France .................................. 97 02859

[51] Int. Cl.[7] .................................................. H04M 11/04
[52] U.S. Cl. .............................. 340/310.01; 340/310.05; 340/310.06; 340/538; 324/520; 324/522
[58] Field of Search .................... 340/310.01, 310.05, 340/310.06, 538; 324/520, 522

[56] References Cited

U.S. PATENT DOCUMENTS

| | | | |
|---|---|---|---|
| 4,885,563 | 12/1989 | Johnson et al. | 340/310.05 |
| 5,223,795 | 6/1993 | Blades | 324/536 |
| 5,512,843 | 4/1996 | Haynes | 324/772 |

FOREIGN PATENT DOCUMENTS 57-174943   10/1982   Japan .

*Primary Examiner*—Edward Lefkowitz
*Attorney, Agent, or Firm*—Larson & Taylor

[57] ABSTRACT

The invention concerns a control device for the emission of carrier currents on a low voltage network, comprising a sensing module (1), by magnetic coupling, for generating from carrier currents detected high frequency signals (shdf), a local oscillator (2) generating a reference frequency radio-electic signal (fr) of a frequency comprised in the signal band (shdf) and a frequency-changing module (3) delivering an audio baseband signal (sbb) based on the (shdf) and (fr) signals. A demodulating circuit (4) delivers a detected low frequency signal (sdbf) based on the baseband signal (sbb) to a transducer circuit (50, 51) generating a sound signal controlling the current carrier frames. The invention is applicable to the implementation and management of current carrier installations on low voltage networks.

7 Claims, 3 Drawing Sheets

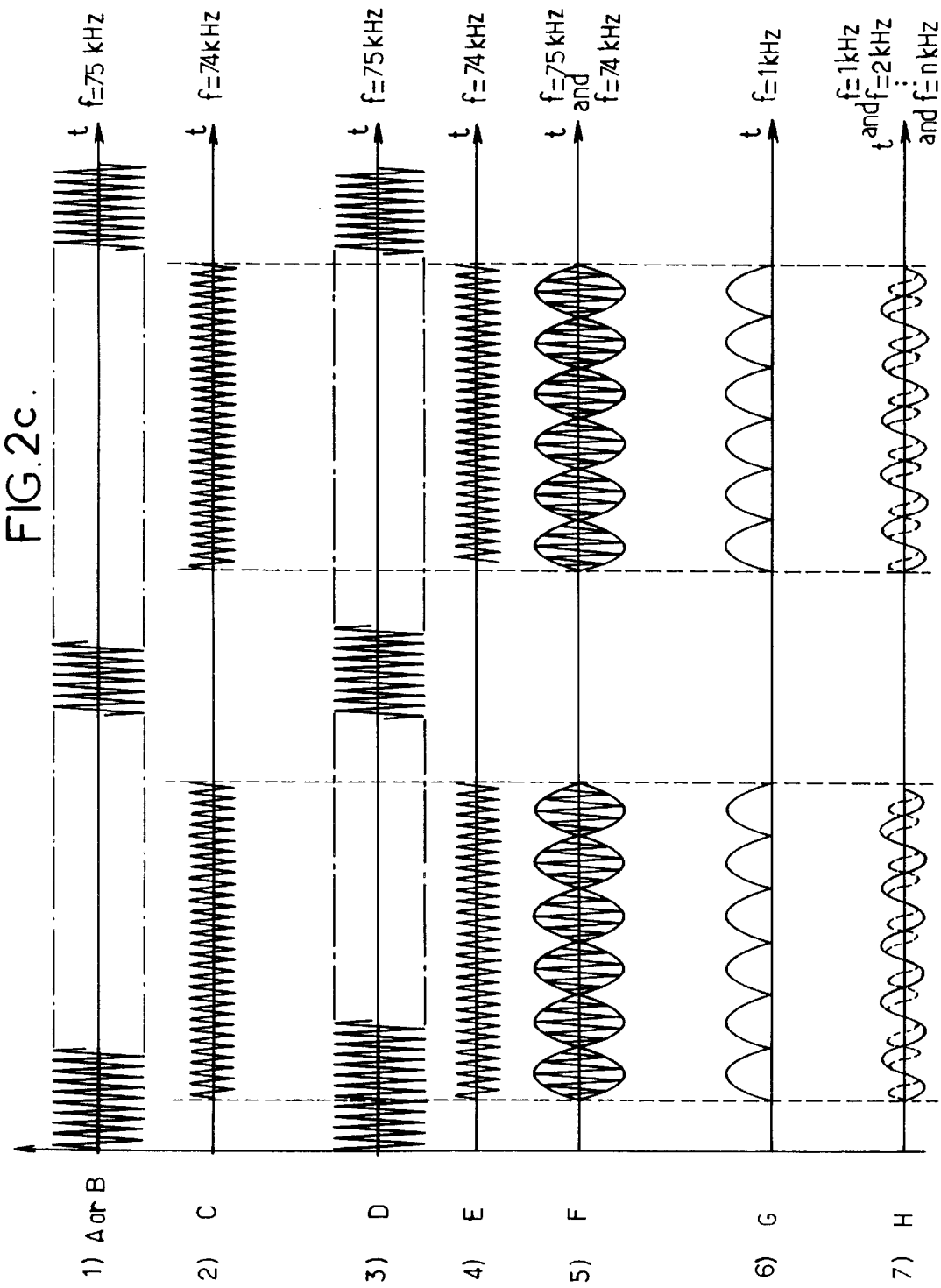

CONTROL DEVICE FOR THE EMISSION OF CARRIER CURRENTS ON A LOW VOLTAGE NETWORK

BACKGROUND OF THE INVENTION

The invention concerns a device for monitoring the transmission of power line carrier currents.

Nowadays, companies or other organizations distributing electrical power to each user of an electrical power distribution network are having to perform more and more service management operations and to provide users with more and more services.

In particular, it is vitally important for such distribution companies or organizations to perform these operations in a manner that is totally or almost totally transparent for users.

The concept of transparency or quasi-transparency encompasses, on the one hand, avoiding repetitive physical intervention on the users' premises, for minimum disturbance to their public, professional or private activities, and, on the other hand, avoiding installing additional physical media for communicating data indispensable to providing or managing the services previously referred to.

In the context of use of the above type of communication means, distribution organizations such as ELECTRICITE DE FRANCE in France have developed communicating customer interface (CCI) systems employing power line carrier currents.

The aim of using power line carrier currents is not to provide a very high bit rate enabling transmission of fixed or animated video images, but to the contrary to provide a generalized service to each user, if possible independently of the configuration of the low voltage network and the relative amount of energy consumed by the user concerned.

Thus at the current stage of development of CCI systems the available data bit rate is 300 bit/s. Depending on the applications concerned, this bit rate could be increased to 2 400 bit/s in the near future.

Data is transmitted in frames synchronized to the "atural" frequency of the AC line voltage, which is 50 Hz in Europe.

Data is transmitted by power line carrier currents in the form of frames comprising 42 bytes, each bytes being encoded by FSK modulation at different first and second frequencies. For low voltage electrical power distribution in particular, the first carrier frequency representative of a true logic value is 60.6 kHz and the second carrier frequency representative of a complemented value of the true logic value is 74 kHz. The modulation process is Spread Frequency Shift Keying (S-FSK).

For provision of services related to street-lighting, the modulation is performed in a frequency band with a center frequency of 86 kHz and the modulation process is frequency shift keying (FSK).

For the provision of services relating to the domestic life of users, i.e. "home automation" applications, the center frequency is 132.5 kHz and the modulation process is usually FSK. In the near future it will be possible to transmit data for this purpose at 2 400 bit/s.

The data frames transmitted, comprising 42 bytes, are followed by absence of any carrier for the duration of 3 bytes, constituting the minimum period of silence between two consecutive frames.

In normal operation, each CCI system incorporating a low voltage PLC (power line carrier) modem repeats frames it receives when it is not sending, with a given repetition credit, every 1.2 s. This mode of operation enables step by step transmission of data, from a management center to any CCI system installed on the network and vice versa, as shown in FIG. 1. The communication protocol is suited to propagation problems on the low voltage distribution network. The repetition of frames, with credits, exploits the synchronous operation of the various CCI systems in order to eliminate any risk of conflict. In a particular frame-time only one frame is present on the low voltage network. The system as a whole has a client-server architecture in which the concentrator in the high voltage to low voltage transformer substation is the master. It stores in memory a table for associating a number of credits (repeats) with each CCI system on a user's premises. The maximum credit of 7 corresponds to 8 repetitions of a frame. Any CCI system receiving an intelligible frame, whether it is addressed to it or not, repeats it in the next frame-time. If the frame is addressed to it, the CCI system concerned sends its response in the frame-time immediately following the 0 credit frame of the incoming message; otherwise, the CCI system waits to receive a new frame before repeating it. FIG. 1 shows operation for communication between the concentrator and the CCI interface with the value of the credit (2 in this case) indicated in each frame, "RECEPTION A" denoting correct reception of the "go" message and "RECEPTION B" denoting correct reception of the "return" message.

In all cases transmitting data, in particular frames, every 1.2 seconds under steady state conditions indicates satisfactory PLC transmission.

It is also totally compatible with assessing the transmission rate by ear. The fact that the low voltage PLC modem of a CCI system repeats data frames reaching it in normal operation or does not repeat them in the case of a fault is significant of its correct or incorrect operation.

At present an approved operative of the distribution organization responsible for installing or administering a CCI system has no simple means of monitoring its operation other than removing the cover of the device and observing the status of the light-emitting diodes. This purely visual inspection does not provide any information as to the intensity of the signals. Qualitative information about the signals can only be obtained by the use on site of costly and bulky equipment, such as an oscilloscope, a spectrum analyzer or the like.

SUMMARY OF THE INVENTION

One aim of the invention is to overcome the disadvantages and shortcomings of the current situation.

Another aim of the invention is to provide a tool for rapid and efficient monitoring of the operation of any CCI system in a low voltage distribution network by any approved operative of the distribution organization managing the network.

Another aim of the present invention is to make the aforementioned tool very flexible in use and to free it of all constraints concerning its weight, overall size, fragility and cost.

A final aim of the present invention, given the foreseeable generalization of CCI installations on the low voltage network and the diversity of impedance mismatches represented by the electrical loads of user installations, which mismatches are particularly prejudicial to the satisfactory propagation of power line carrier currents, to provide a tool that is particularly convenient to handle and efficient, so that the quality of the link following such installation can be guaranteed.

The device in accordance with the invention for monitoring transmission of power line carrier currents on a low voltage electrical power distribution network, the power line carrier currents comprising a series of bursts of radio frequency signals at first and second carrier frequencies respectively representative of the true value of a logical signal in the form of frames and the complemented value of that true value, is noteworthy in that it includes a sensor module employing magnetic coupling to generate from the power line carrier currents a series of detected high frequency signals the frequency of which is equal to the carrier frequency of the radio frequency signals and a local oscillator module for generating at least one radio frequency reference frequency signal the frequency of which is in the frequency band of the detected signals. A frequency changer module receives the detected high frequency signals and the radio frequency reference frequency signal and delivers a baseband audio frequency signal. A demodulator circuit receives the baseband audio frequency signal and delivers a detected low frequency signal representative of the envelope of the frames constituting the power line carrier currents. A transducer circuit receives the detected low frequency signal and generates a sound signal representative of the existence or the non-existence of power line carrier currents on the low voltage electrical power distribution network.

The device in accordance with the present invention finds an application in monitoring the transmission or retransmission of power line carrier currents used to provide the most varied services, such as low voltage power distribution management, streetlighting, home automation or like services, independently of the frequency, frequency band and type of FSK modulation used.

BRIEF DESCRIPTION OF THE DRAWINGS

The invention will be better understood after reading the following description and examining the accompanying drawings in which, in addition to FIG. 1 relating to the propagation of data frames on a low voltage network in accordance with the prior art:

FIG. 2c shows a series of timing diagrams 1) through 7) of notable signals at test points of the device from FIG. 2a.

DETAILED DESCRIPTION OF THE PREFERRED EMBODIMENTS

Figure 1:
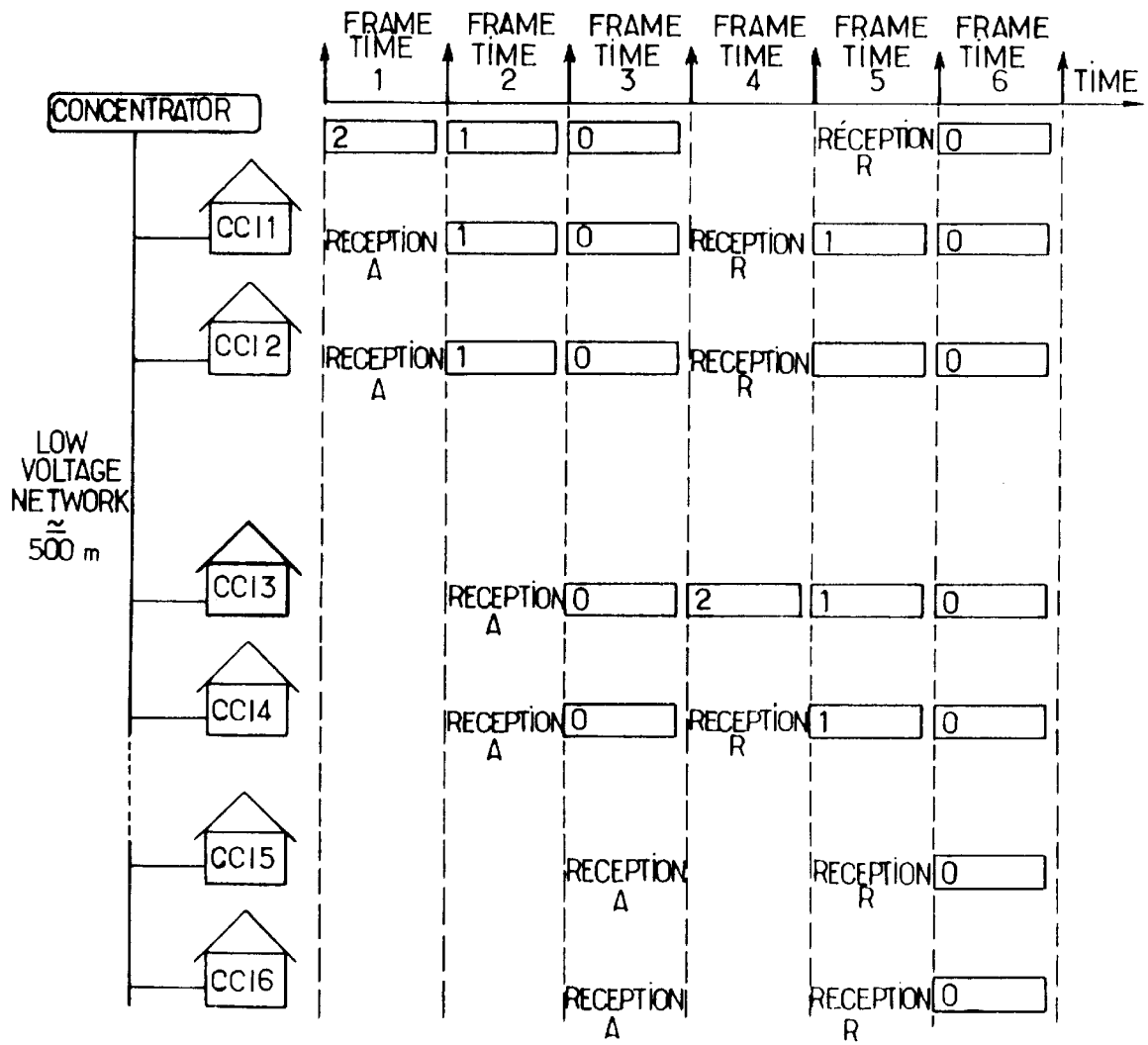
Figure 2B:
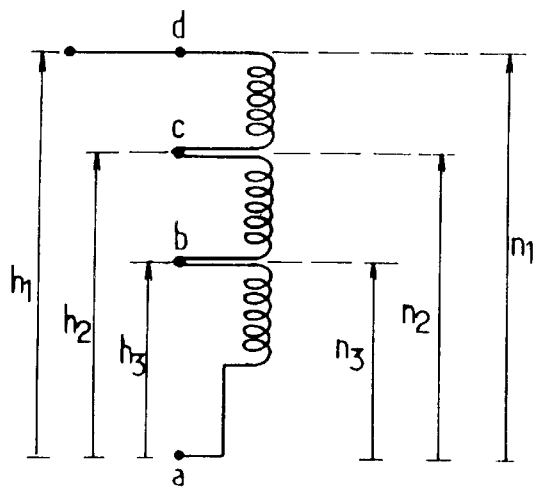
FIG. 2b shows a detail of the FIG. 2a embodiment.

A device in accordance with the present invention for monitoring the transmission of power line carrier currents on a low voltage electrical power distribution network will now be described in more detail with reference to FIGS. 2a and 2b.

Power line carrier currents consist of a series of bursts of radio frequency signals transmitted on first and second carrier frequencies respectively representative of the true value of a logic signal made up of frames and the complemented value of that true value.

In the case of low voltage electrical power distribution, the first frequency can be 60.6 kHz and the second carrier frequency can be 74.0 kHz. In this case, the process used to modulate the power line carrier currents is the S-FSK process known per se, as previously mentioned.

In the case of streetlighting, for example, the modulation process used to transmit power line carrier currents is associated with a center frequency of 86 kHz in a frequency band not exceeding 10% of the value of the center frequency and the chosen two carrier frequencies, i.e. the first and second carrier frequencies can be spaced by a few hundred Hertz from the center frequency, for example. In this case the values of the first and second carrier frequencies are not significant in themselves and it is sufficient for the value of the aforementioned carrier frequencies to lie within the frequency band previously mentioned.

The same applies to power line carrier currents in the case of a service such as home automation, for which the modulation process employed is an FSK process associated with a particular frequency band about the center frequency of 132.5 kHz.

Figure 2A:
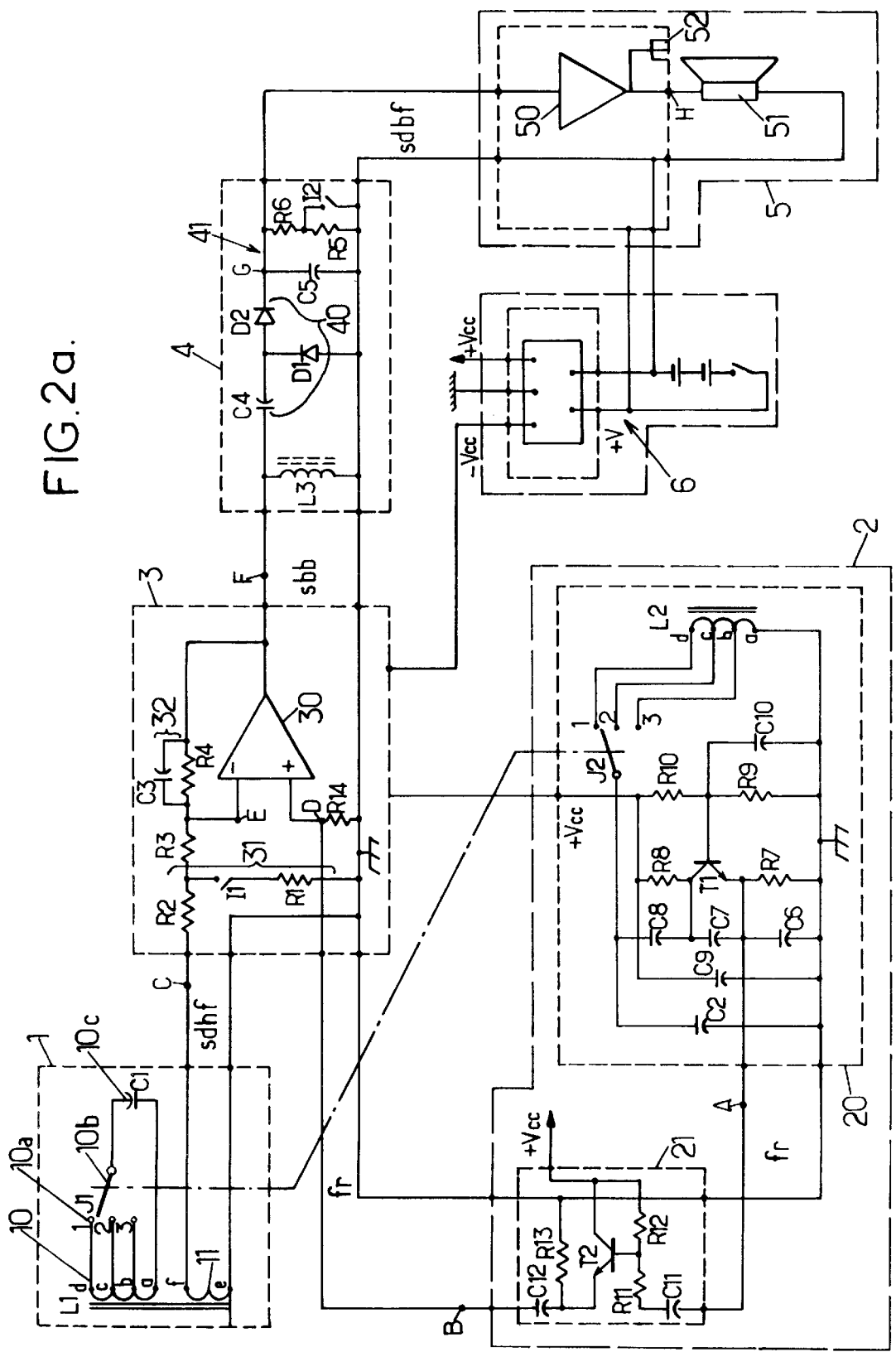
FIG. 2a is a block diagram of a device in accordance with the present invention.

According to one particularly noteworthy feature of the device in accordance with the invention for monitoring the transmission of power line carrier currents on a low voltage electrical power distribution network, and as shown in the previously mentioned FIG. 2a, the device includes at least one sensor module 1 which is magnetically coupled to the low voltage line to generate a series of detected high frequency signals sdhf from the power line carrier currents. The carrier frequency of the detected high frequency signals is equal to the carrier frequency of the radio frequency signals. This frequency is therefore in the range 50 kHz to 150 kHz.

As shown in the aforementioned FIG. 2a, the device includes a local oscillator module 2 for generating at least one radio frequency reference frequency signal fr. The frequency of the radio frequency reference frequency signal fr and the frequency band of the detected high frequency signal sdhf.

A frequency changer module 3 receives the detected high frequency signals sdhf and the radio frequency reference frequency signal fr and delivers a baseband audio frequency signal sbb.

In accordance with one particularly advantageous feature of the device in accordance with the invention, the baseband audio frequency signal sbb is therefore audible, the audible nature of this signal enabling flexible and simple use of the monitoring device in accordance with the present invention under conditions that will be explained later in the description.

As is also shown in the aforementioned FIG. 2a, the device in accordance with the present invention includes a demodulator circuit 4 receiving the baseband audio frequency signal and delivering a detected low frequency signal sdbf which is representative of the envelope of the frames constituting the power line carrier currents.

The system comprising the sensor module 1, the oscillator module 2, the frequency changer module 3 and the demodulator circuit 4 is completed by a transducer circuit 5 receiving the detected low frequency signal sdbf and generating an audible signal representative of the existence or non-existence, more generally the amplitude, of power line carrier currents on the low voltage electrical power distribution network near which the detector module 1 is placed.

The detected low frequency signal is in fact representative of the succession of data frames transmitted by the power line carrier currents and which, having the audible nature of the baseband audio frequency signal, enables the operative responsible for installing and/or checking the CCI to perform this operation by listening to the sound emitted by the aforementioned detected low frequency signal sdbf.

A more detailed description of the components of the combination for implementing the device in accordance with the present invention for monitoring transmission of power line carrier currents on a low voltage power distribution network, comprising the sensor module 1, the local oscillator module 2, the frequency changer module 3, the modulator circuit 4 and the transducer circuit 5, will now be given with reference to FIG. 2a.

The sensor module 1 includes a magnetic circuit whose self-inductance resonates with a fixed capacitor C1, regardless of the operating frequency, i.e. the frequency of the S-FSK or pure FSK carrier or any other carrier signal.

As shown in FIG. 2a, a preferred embodiment of the sensor module 1 advantageously includes a primary magnetic circuit 10 formed by a variable inductor 10a and a fixed capacitor 10c forming a resonant circuit with the variable inductor. The characteristics of the resonant circuit are determined by the setting of a multi-position switch J1 (10b), which is set to position 1, 2 or 3 to choose the appropriate frequency of resonance between the inductor L1 and the capacitor C1. The resonant frequency is typically 74 kHz or 86 kHz or 132.5 kHz, according to the setting of switch J1.

The primary magnetic circuit formed by the inductor L1 is coupled to a secondary magnetic circuit 11, the primary inductor 10a and the secondary inductor 11 being coupled by virtue of their mutual inductance. The secondary magnetic circuit 11 therefore delivers the detected high frequency signals, i.e. the signal sdhf previously mentioned in the description.

As shown in FIG. 2a, the local oscillator module 2 can advantageously comprise a transistorized RLC oscillator module 20 followed by a buffer stage 21 connected to the output of the oscillator module 20 and delivering the radio frequency reference frequency signal fr.

As shown in FIG. 2a, the oscillator module 20 includes a switch J2 mechanically coupled to the switch J1 of the coupler module 1. Of course, the switches J1 and J2, i.e. the switch 10b of the detector module 1 and the switch J2 of the module 20, are operated simultaneously by the operative to set the resonant frequency of the sensor module 1 and the oscillation frequency of the oscillator module 20 to the frequency of the power line carrier currents on the low voltage distribution network.

The oscillator module essentially comprises an active component in the form of a transistor T1. The transistor T1 is configured as a HARTLEY oscillator by an emitter resistor R7, a collector resistor R8, bias resistors R10 and R9 and capacitors C2, C6, C7, C8, C9 and C10. The switch J2 provides the connection between the collector of the transistor T1 via the capacitor C8 and the base of the same transistor T1 via the capacitor C10 and the inductor L2. The inductor L2 has intermediate taps connected to the switch terminals of the switch J2. Settings 1, 2 and 3 of the switch J2 correspond to settings 1, 2 and 3 of the switch J1.

Thus selecting an appropriate position of the switch J1 or J2 modifies the value of the inductor L1 in the sensor module 1 and the value of the inductor L2. As shown in FIG. 2b, the following relations apply for a number of turns equal to $n_1$, $n_2$, $n_3$:

$$f_2/f_1 = n_1/n_2 \text{ and } f_3/f_2 = n_2/n_3$$

If the condition for resonance is satisfied, i.e. if $LC\Omega_0^2=1$, where L is the inductance of the inductor L2 between the intermediate tap concerned and the reference voltage and C is the equivalent capacitance of the HARTLEY oscillator, with $L=k.n_2$ the above equation becomes:

$$k.n^2.4\pi^2 f^2 = 1/C$$

It can then be shown that:

$$nf = (1/2\pi).(1/\sqrt{kC})$$

which is substantially constant for each intermediate position with $n=n_1$, $n_2$ or $n_3$.

The Q of the circuit, which is proportional to L, the value of the inductor selected by the switch J at constant frequency, must render the sensor module 1 sufficiently selective for only the pertinent frequency to be heard whilst guaranteeing sufficient bandwidth for the modulated signals to be heard.

Trials have shown that it is possible to use a total number of turns for the inductor L1 or L2 equal to $n_1=18$ for the frequency of 74 kHz, $n_2=16$ for the frequency of 86 kHz and $n_3=n$ 10 for the frequency of 132.5 kHz.

The above equations then yield the following numerical values:

18×74=1332; 16×86=1366; 10×132.5=1325 which is a substantially constant value allowing for the fact that the Q of the resonant circuit is less than or equal to 10.

The buffer stage 21 is a separator stage between the oscillator module 20 and the input circuit of the frequency changer stage 3 coupled to the detector circuit 1. As shown in FIG. 2a, the buffer stage 21 includes a transistor T2 in a common collector circuit with its HF connections provided by coupling capacitors C11 and C12. The buffer stage 21 therefore has a high impedance input which is connected in parallel to the output of the oscillator module 20 and a low impedance output which is connected directly to the input circuits of the mixer stage 3.

As shown in FIG. 2a, the frequency changer circuit 3 includes an operational amplifier configured as a differential amplifier and having an inverting input and a non-inverting input. The non-inverting input is connected to the reference voltage via a resistor R14 and directly to the low impedance output of the buffer stage 21 previously mentioned. The non-inverting input therefore receives the radio frequency reference frequency signal fr delivered by the oscillator module 20, to be more specific by the buffer stage 21 under the conditions of impedance separation mentioned previously in the description.

As shown in the same FIG. 2a, the frequency changer module 3 includes a potentiometer voltage divider 31 formed by a resistor bridge R1, R2, R3 controlled by a switch I1. The output of the resistor bridge is connected via the resistor R3 to the inverting input of the operational amplifier 30. Closing and opening the switch I1 adjusts the RF sensitivity of the system, i.e. selects a low gain for I1 in the closed position and a high gain for I1 in the open position. The potentiometer voltage divider 31 therefore applies adjusted high frequency signals to the inverting input of the operational amplifier 30. The frequency changer module 3 finally includes a feedback circuit 32 comprising a resistor R4 in parallel with a capacitor C3, the values of the resistor R4 and the capacitor C3 defining the overall gain and rendering the amplifier system stable.

Accordingly, the mode of operation of the frequency changer module can be summarized as follows: for a detected radio frequency signal sdhf and for a reference frequency signal fr of similar frequency, the frequency changer module 3 delivers the baseband signal sbb whose frequency is equal to the difference between the frequencies of the radio frequency reference frequency signal fr and the detected high frequency signal sdhf. This signal is in fact the envelope of a signal whose carrier frequency is equal to the arithmetic mean of the frequencies of the detected high frequency signal sdhf and the radio frequency reference frequency signal fr.

By way of non-limiting example, and for positions 1, 2, 3 of switches J1 and J2 as shown in FIG. 2a, the frequency fr of the radio frequency reference frequency signal fr takes the following successive values:

75 kHz for electrical power distribution,
84.375 kHz for streetlighting, and
135 kHz for home automation.

The baseband audio frequency signal sbb therefore has an envelope representative of the envelope of the frames transmitted by the low voltage distribution network.

Finally, the demodulator circuit 4 can advantageously include a quasi-peak detector circuit 40 (FIG. 2a) for doubling the detected peak voltage. This circuit receives the baseband audio frequency signal and delivers a quasi-peak signal described later. The circuit 40 is advantageously formed by an inductor L3 shunting the input terminals of the demodulator circuit 4, a capacitor C4 and diodes D1, D2, the diode D1 being connected between the output side of the capacitor C4 and the reference voltage and the diode D2 being connected to transmit positive half-cycles of the detected signal. The quasi-peak detector circuit 40 is followed by a potentiometer voltage divider circuit 41 (FIG. 2a) including a capacitor C5 connected between the output of the diode D2 and the reference voltage and two series-connected resistors R6, R5 shunting the capacitor C5, a switch I2 selectively short circuiting the resistor R5. The switch I2 adjusts the amplitude of the LF signal detected in this way, the closed position reducing the level of the signal while the open position of the switch I2 increases the level of the LF signal delivered by the demodulator circuit 4.

The demodulator circuit 4 therefore recovers the envelope of frames transmitted on the low voltage distribution network.

To be more precise, opening the switch I2 causes the low frequency voltage at the terminals of capacitor C5 to fall. This modifies the spectral weighting of the low frequency signal driving the input of the transducer circuit 5. The time constant is then R6.C5 which degrades the filtering of residual high frequencies and therefore improves the transmission of high sounds to the aforementioned transducer module 5. The final sound volume is also set by the switch I2. When the signals have a high amplitude the gain required is low and switch I2 can be closed. The high components are then easily tolerated. On the other hand, if the signal received has a low level at the sensor module 1, a higher gain is required which, in the absence of any tone correction, would render high sounds more perceptible to the ear and therefore more uncomfortable.

As shown in FIG. 2a, the transducer circuit 5 includes an amplifier circuit 50. This is an analogue low frequency amplifier receiving the detected low frequency signal sdbf. The transducer circuit 5 also includes a loudspeaker 51 connected to the output of the analogue low frequency amplifier and generating the sound signal representing the succession of transmitted frames.

In addition to the loudspeaker 51 previously mentioned, the output of the amplifier 50 can also be connected to a socket 52 such as a BNC socket for connecting any kind of measuring instrumentation or graphical output device. For a frequency of the radio frequency reference frequency signal fr=135 kHz and for $n_3$=10 turns, the loudspeaker 51 emits a sound signal whose fundamental frequency is equal to:

2.5 kHz for the AF signal from the frames of a home automation signal,
1.625 kHz for the AF signal from the frames of a street lighting signal, and
1 kHz for the AF signal from low voltage distribution frames.

The electrical power supply to the system is provided by a power supply unit 6 which, although its nature is not decisive, can be as described below, for example. The power supply unit 6 includes an on/off switch which the operative merely presses to turn on the device and a storage battery, for example a dry cell, delivering a standardized voltage Vp. This voltage can be 6 volts, for example. The power supply unit 6 also includes a TRACO POWER PRODUCTS TEF 0522 voltage adapter module. The voltage adapter receives the battery voltage Vp and delivers, relative to the 0 volt reference voltage of the device, a first voltage +Vcc and an equal and opposite supply voltage –Vcc. The voltages +Vcc and –Vcc are distributed to each of the modules previously described, including the frequency changer module 3 which uses both supply voltages +Vcc and –Vcc to power the operational amplifier 30.

Line 1) in FIG. 2c shows the radio frequency reference frequency signal fr delivered by the oscillator module or by the buffer stage 21 for a frequency equal to 75 kHz, for example.

Line 2) in FIG. 2c shows the detected high frequency signal sdhf delivered at point C in FIG. 2a. The signal sdhf is a periodic signal at the frame period, each frame corresponding to a burst of carrier frequencies f=74 kHz in the example described.

Line 3) in FIG. 2c shows the signal at test point D, i.e. at the non-inverting input of the operational amplifier 30 of the frequency changer module 3. This signal is identical to the signal at test point A or B.

Line 4) in FIG. 2c shows the signal at test point E of the frequency changer module 3, i.e. at the inverting input of the operational amplifier 30. This signal is substantially identical to that at test point C shown in line 2) of FIG. 2c, allowing for the open or closed position of the switch I1 accounting for a difference in amplitude.

Line 5) in FIG. 2c shows the signal at test point F delivered by the frequency changer module 3, i.e. the baseband audio frequency signal sbb. This signal represents the envelope of beating between the frequency of the detected high frequency signal sdhf and the radio frequency reference frequency signal fr carried by a carrier frequency equal to the arithmetic mean of the carrier frequencies and the aforementioned signals.

Line 6) in FIG. 2c shows the signal delivered in the demodulator circuit 4 by the quasi-peak detector circuit 40, this circuit delivering the rectified envelope (ignoring an amplitude factor) of the baseband audio frequency signal sbb at test point F.

Finally, line 7) in FIG. 2c shows the signal obtained at test point H in FIG. 2a, i.e. at the output of the audio frequency amplifier 50, the signal obtained in fact corresponding to the fundamental frequency of that signal, which is applied to the loudspeaker 51 or, where appropriate, to the output 52, as previously mentioned.

In addition to the fundamental frequency signal previously referred to, there exist at the output the components of the signal represented at test point G corresponding to harmonics of the fundamental frequency, the resulting signal in fact corresponding to a Fourier series analysis of the signal present at the aforementioned test point G.

A device for monitoring the transmission of power line carrier currents on a low voltage electrical power distribution network has therefore been described offering particularly high performance and having many advantages over prior art techniques.

The aforementioned advantages include:

the ruggedness of the device, because no quartz crystal is required in the local oscillator, so that the device can be rugged and suitable for field use. The ruggedness of the device in accordance with the invention is further promoted by the virtual absence of factory settings. Once the sensitivity values have been defined, there are virtually no adjustments and the device can be mass produced without adjustment.

simplicity: simplicity of use is greatly facilitated by the reduced number of controls. There are only an on/off switch and a frequency switch for setting the sensor and the oscillator to the required frequency, according to the working frequency concerned. The switches or potentiometers for adjusting the HF or LF sensitivity are particularly simple to use. The setting of the aforementioned switches I1 and I2 and the corresponding resistance values can be chosen so that the amplitude of sound level variation varies 20 dB.

handling: the dimensions of the device are those of a tool, and therefore substantially smaller than any signal analyzing equipment such as an oscilloscope or a spectrum analyzer. The weight of the tool is also reduced by its simple printed circuit fitted with its electronic components and suitable power supply batteries.

battery life: the device in accordance with the present invention can be powered by four 1.5 volt batteries, the voltage Vp being equal to 6 volts, for several tens of hours operation without replacing the batteries.

cost: the electronic components used are simple and widely available off the shelf, and therefore very cheap.

safety: the magnetic sensor module 1 is designed to operate without any connection to the low voltage electrical power distribution network, unlike conventional measuring instruments. This guarantees that its use is entirely safe for the operative. What is more, use of the device in accordance with the present invention is totally transparent for the PLC systems of CCI in operation.

the device in accordance with the invention enables fast exploitation of the expertise and qualifications of operatives by enhancing the concept of know-how as manifested in the context of a trade in the real sense of that term.

For a skilled operative, the device in accordance with the present invention enables rapid identification of a malfunction of any PLC equipping a CCI. These malfunctions can be:

absence of any signal received distinctly, indicating an excessive distance between the PLC equipment, i.e. the preceding CCI and that being investigated by the operative;

a weak signal whose duration is substantially equal to one frame time followed by stronger frames characteristic of correct operation of the PLC device and the associated CCI;

a succession of weak frames received with no increase in level reveals the absence of repetition of the CCI under investigation and probably a functional deficiency of the CCI equipment;

the presence of noise in the operating frequency band is rapidly demonstrated by meaningful sounds superposed on the regular melody of the frames.

What is claimed is:

1. A device for monitoring the transmission of power line carrier currents on a low voltage electrical power distribution network, said power line carrier currents comprising a series of bursts of radio frequency signals at first and second carrier frequencies respectively representative of the true value of a logical signal in the form of frames and the complemented value of that true value, characterized in that said device includes:

sensor means employing magnetic coupling to generate from said power line carrier currents a series of detected high frequency signals the carrier frequency of which is equal to the carrier frequency of the radio frequency signals;

local oscillator means for generating at least one radio frequency reference frequency signal the frequency of which is in the frequency band of the detected signals;

frequency changer means receiving said detected high frequency signals and said radio frequency reference frequency signal and delivering a baseband audio frequency signal;

a demodulator circuit receiving said baseband audio frequency signal and delivering a detected low frequency signal representative of the envelope of the frames constituting said power line carrier currents; and a transducer circuit receiving the detected low frequency signal and generating a sound signal representative of the existence or the non-existence of power line carrier currents on the low voltage electrical power distribution network.

2. A monitoring device according to claim 1 characterized in that said magnetic field sensor means include:

a primary magnetic circuit comprising a variable inductor and a fixed capacitor forming a resonant circuit with the variable inductor; and a secondary magnetic circuit coupled to the primary magnetic circuit by their mutual inductance, said secondary magnetic circuit delivering said detected high frequency signals.

3. A monitoring device according to claim 1 characterized in that said local oscillator means comprise:

a transistorized oscillator module including resistors, inductors and capacitors; and a buffer stage connected to the output of said oscillator module and delivering said radio frequency reference frequency signal.

4. A device according to claim 1 characterized in that said frequency changer means include:

an operational amplifier configured as a differential amplifier having an inverting input and a non-inverting input, the non-inverting input being connected to the reference voltage via a resistor and receiving said radio frequency reference frequency signal;

a potentiometer voltage divider receiving said detected high frequency signals and applying adjusted high frequency signals to said inverting input; and a resistor-capacitor feedback circuit connecting the output of said operational amplifier and said inverting input and defining the gain of the amplifier, the output of said operational amplifier delivering said baseband audio frequency signal.

5. A device according to claim 1 characterized in that said demodulator circuit includes:

a quasi-peak detector circuit receiving said baseband audio frequency signal; and a potentiometer voltage divider circuit delivering from said diode alignment circuit said detected low frequency signal.

6. A device according to claim 1 characterized in that said transducer circuit includes:

an analogue low frequency amplifier circuit receiving said detected low frequency signal; and a loudspeaker connected to the output of said analogue low frequency amplifier and generating said sound signal.

7. A device according to claim 6 characterized in that the transducer circuit has a connecting terminal connected to the output of the low frequency amplifier.

* * * * *